(12) United States Patent
Talluri

(10) Patent No.: US 6,263,315 B1
(45) Date of Patent: Jul. 17, 2001

(54) REVENUE MANAGEMENT SYSTEM AND METHOD

(75) Inventor: Kalyan Talluri, Millwood, NJ (US)

(73) Assignee: Pricing Research Corporation, Millwood, NJ (US)

( * ) Notice: Subject to any disclaimer, the term of this patent is extended or adjusted under 35 U.S.C. 154(b) by 0 days.

(21) Appl. No.: 09/184,234

(22) Filed: Nov. 2, 1998

(51) Int. Cl.$^7$ .................................................. G06F 17/60

(52) U.S. Cl. ........................ 705/8; 705/6; 705/5; 705/10
(58) Field of Search .................................. 705/28, 6, 8, 5, 705/10; 340/5, 6, 8, 10, 20, 26, 28, 825.28; 703/6; 707/1; 709/100; G06F 17/60, 15/26

(56) References Cited

U.S. PATENT DOCUMENTS

| | | |
|---|---|---|
| 2,542,890 | 2/1951 | Basu et al. . |
| 2,883,106 | 4/1959 | Cornwell et al. . |
| 4,862,357 | 8/1989 | Ahlstrom et al. . |
| 5,255,184 | 10/1993 | Hornick et al. . |
| 5,270,921 * | 12/1993 | Hornick . |
| 5,404,291 * | 4/1995 | Kerr et al. . |
| 5,652,867 * | 7/1997 | Barlow et al. . |
| 5,897,620 | 4/1999 | Walker et al. . |
| 5,918,209 * | 6/1999 | Campbell et al. . |
| 6,897,620 * | 4/1999 | Walker et al. . |

OTHER PUBLICATIONS

Ben Vinod, "Reservation Inventory Control Techniques to Maximize Revenues," The Third International Airline Management Conference, (Dec. 3, 1990).
S.L. Brumelle, et al., "Airline Seat Allocation with Multiple Nested Fare Classes," Operations Research, vol. 41 (No. 1), p. 127–137, (Jan.–Feb. 1993).
R.E. Curry, "Real–Time Revenue Management," Scorecard–The Revenue Mangement Quarterly, (Second Quarter, 1992).
Barry C. Smith, et al., "Yield Mangement at American Airlines," Interfaces 22, p. 8–31, (Jan.–Feb. 1992).
Richard D. Wollmer, "An Airline Seat Management Model for a Single Leg Route When Lower Fare Classes Book First," Operations Research, vol. 40 (No. 1), p. 26–37, (Jan.–Feb. 1992).
S.L. Brumelle, et al., "Allocation of Airline Seats Between Stochastically Dependent Demands," Transportation Science, vol. 24 (No. 3), p. 183–192, (Aug. 1990).
Renwick E. Curry, "Optimal Airline Seat Allocation with Fare Classed Nested by Origins and Destinations," (1989).
Peter P. Belobaba, "Airline Yield Management, An Overview of Seat Inventory Control," Transportation Science, vol. 21, (No. 2), p. 63–73, (May, 1987).
E.L. Williamson, "Comparison of the Optimization Techniques for Origin–Destination Seat Inventory Control," Flight Transportation Lab Report R88–2, MIT, (5/1988).

E.L. Williamson, "Airline Network Seat Inventory Control: Methodologies and Revenue Impacts," Flight Transportation Lab Report R92–3, MIT, (6/1992).
F. Glover, et al., "The Passenger–Mix Problem in the Scheduled Airlines," Interfaces, vol. 12, pp 73–79 (6/1982).
K. Littlewood, "Forecasting and Control of Passenger Bookings," British Overseas Airways Corp. (10/1972).
R. Phillips, "A Marginal–Value Approach to Airline Origin and Destination Revenue Management," Decision Focus Incorporated (1994).
R. Simpson, "Using Network Flow Techniques to Find Shadow Prices for Market Demands and Seat Inventory Control," Flight Transportation Lab Memorandum M89–1 (1/1989).
P. Belobaba, "Application of a Probabilistic Decision Model to Airline Seat Inventory Control," Operations Research, vol. 37, pp. 183–197 (3–4/1989).
Belobaba, "Airline yield management, an overview of seat inventory control", from Transportation Science, vol.21, No. 2, pp. 63–73, May 1987.*
Wollmer, "An airline seat management model for a signle leg route when lower fare classes book first", from Operation Research, vol.40, No. 1, pp. 37, Feb. 1992.*
Curry, "Optimal airline seat allocation with fare classes nested by origins and destinations", from Aeronomic Incorporated, pp. 1–22, Jun. 1990.*
Morash et al., "Scheduling management of transportation service response capacity to improve perceived quality", in Logistics and Transportation Review, vol. 31, No. 4, pp. 353–375, Jan. 1997.*
Brumelle et al., "Airline seat allocation with multiple nested fare classes", from Operation Research, vol.41, No. 1, pp. 127–137, Feb. 1993.*
Brumelle et al., "Allocation of airline seats between stochastically dependent demands", from Transportation Science, vol.24, No. 3, pp. 183–192, Aug. 1990.*
Smith et al., "Yield management at American Airlines" from Interfaces, vol.22, No. 1, pp. 8–31, Feb. 1992.*

(List continued on next page.)

*Primary Examiner*—James P. Trammell
*Assistant Examiner*—Cuong H. Nguyen
(74) *Attorney, Agent, or Firm*—Jones, Tullar & Cooper PC

(57) ABSTRACT

A revenue management software system supports decisions to accept or deny requests for resource capacity (seats, rooms, volume/weight, air time, etc.) using control logic that accesses multidimensional lookup tables of price values for each resource (flight leg, hotel day, etc.). Each dimension of each lookup table corresponds to a variable that affects the value for the resource. As an example where the resource is airline seating capacity for a given flight itinerary, a two-dimensional threshold value table is employed for each flight leg in the itinerary where the first dimension specifies the current time slot and the other dimension the current number of reservations accepted (reservation level) for the flight leg. A request for a seat on the flight is accepted if and only if its net revenue exceeds or equals the sum of the current table values (i.e. the table entries corresponding to the current time and current reservation level) for each requested flight leg.

20 Claims, 4 Drawing Sheets

OTHER PUBLICATIONS

Vinod et al., "Reservation inventory control techniques to maximize revenues", from The 3rd Inter. Airline yield management conf. at London, Dec. 1990.*

Curry, A technical brief of "Real–time revenue management", from Aeronomics Incorporated, Jun. 1992.*

Lewis et al., "Logistics and information technology: A coordination perspective", from Jour. of Business Logistics, ISSN: 0735–3766, v18n1, pp. 141–157, 1997.*

Chapman et al., "Demand/Capacity management in health care: an application of yield management ", from Health Care Management Review, ISSN: 0361–6274, v17n4, pp. 45–54, Sep. 1992.*

Feldman, "Keeping it in the black; managing revenue for fun and profit", from Air Transport World, ISSN: 0002–2543, p34(5), Aug. 1987.*

Davis, "Vision meets science: NASA's airborne vision system for infrared star tracking", from Advanced Imaging, ISSN: 1042–0711, v10n11, p78(3), Nov. 1995.*

Anderson, "Results of competitive sales", from Bond Buyer, 330, 30768, 22, Nov. 1999.*

Bruni et al., "Optimal capacity management of virtual paths in ATM networks", from Global telecommunications conf. 1994, PP. 207–211, vol.1, Dec. 1994.*

* cited by examiner

Table 1 - Resource 1

| t \ x | 0 | 1 | 2 | 3 | 4 | 5 | 6 | 7 | 8 | 9 | 10 |
|---|---|---|---|---|---|---|---|---|---|---|---|
| 0 | 0 | 0 | 0 | 0 | 0 | 0 | 0 | 0 | 0 | 0 | 0 |
| 1 | 0 | 48 | 0 | 0 | 0 | 0 | 0 | 0 | 0 | 0 | 0 |
| 2 | 0 | 76.8 | 19.2 | 0 | 0 | 0 | 0 | 0 | 0 | 0 | 0 |
| 3 | 0 | 94.08 | 42.24 | 7.68 | 0 | 0 | 0 | 0 | 0 | 0 | 0 |
| 4 | 0 | 104.4 | 62.98 | 21.5 | 3.072 | 0 | 0 | 0 | 0 | 0 | 0 |
| 5 | 0 | 110.7 | 79.56 | 38.09 | 10.44 | 1.229 | 0 | 0 | 0 | 0 | 0 |
| 6 | 0 | 114.4 | 92.01 | 54.68 | 21.5 | 4.915 | 0.492 | 0 | 0 | 0 | 0 |
| 7 | 0 | 116.6 | 101 | 69.61 | 34.78 | 11.55 | 2.261 | 0.197 | 0 | 0 | 0 |
| 8 | 0 | 118 | 107.2 | 82.15 | 48.71 | 20.84 | 5.977 | 1.022 | 0.079 | 0 | 0 |
| 9 | 0 | 118.8 | 111.5 | 92.19 | 62.09 | 31.99 | 11.92 | 3.004 | 0.456 | 0.031 | 0 |
| 10 | 0 | 119.3 | 114.4 | 99.93 | 74.13 | 44.03 | 19.95 | 6.571 | 1.475 | 0.201 | 0.013 |

FIG. 2A

Table 2 - Resource 2

| t \ x | 0 | 1 | 2 | 3 | 4 | 5 | 6 | 7 | 8 | 9 | 10 |
|---|---|---|---|---|---|---|---|---|---|---|---|
| 0 | 0 | 0 | 0 | 0 | 0 | 0 | 0 | 0 | 0 | 0 | 0 |
| 1 | 0 | 24 | 0 | 0 | 0 | 0 | 0 | 0 | 0 | 0 | 0 |
| 2 | 0 | 43.2 | 4.8 | 0 | 0 | 0 | 0 | 0 | 0 | 0 | 0 |
| 3 | 0 | 58.56 | 12.48 | 0.96 | 0.192 | 0 | 0 | 0 | 0 | 0 | 0 |
| 4 | 0 | 70.85 | 21.7 | 3.264 | 0.806 | 0.038 | 0 | 0 | 0 | 0 | 0 |
| 5 | 0 | 80.68 | 31.53 | 8.95 | 2.035 | 0.192 | 0.008 | 0 | 0 | 0 | 0 |
| 6 | 0 | 88.54 | 41.36 | 11.87 | 4.001 | 0.561 | 0.045 | 0.002 | 0 | 0 | 0 |
| 7 | 0 | 94.83 | 50.79 | 17.76 | 6.754 | 1.249 | 0.148 | 0.01 | 3E-04 | 0 | 0 |
| 8 | 0 | 99.87 | 59.6 | 24.37 | 10.28 | 2.35 | 0.368 | 0.038 | 0.002 | 6E-05 | 0 |
| 9 | 0 | 103.9 | 67.66 | 31.42 | 14.5 | 3.935 | 0.784 | 0.104 | 0.009 | 5E-04 | 1E-05 |
| 10 | 0 | 107.1 | 74.9 | 38.66 | | | | | | | |

FIG. 2B

REVENUE MANAGEMENT SYSTEM AND METHOD

BACKGROUND OF THE INVENTION

1. Field of the Invention

The present invention relates in general to a revenue management system (also referred to as "yield management" system) for allocating resources or inventory in which a multidimensional lookup table of threshold values is employed for each resource as the control logic for dynamically adjusting the acceptable revenue value for the resources as a function of two or more variables.

2. Description of the Prior Art

Revenue management systems seek to maximize the revenue generated from a fixed service or productive capacity by selectively accepting or denying requests for capacity. For example, in airlines a network of flights with a set of seats are available for sale on a given day, and customers request seats in advance of travel for various itineraries on the network. Based on the current reservations already accepted for each flight (alternatively, the remaining capacity available), the time remaining in the sales horizon and forecasts of future demand for itineraries, airlines must decide which itineraries and fare classes to accept and which to deny (or close out).

These decisions are very detailed and complicated to make because future demand is typically highly uncertain and one must evaluate complex tradeoffs between the current and future value of capacity. Therefore, revenue management decisions are typically made or guided by a software system (revenue management system) that incorporates a variety of advanced statistical and mathematical methods. Revenue management is widely used in the airline, hotel and car-rental industries and is spreading to the energy, natural gas pipelines, broadcasting, shipping, sports, entertainment facilities, manufacturing, equipment leasing and cargo industries. Indeed, the practice is applicable in any industry that has limited short-term capacity flexibility and variable demand.

A variety of mathematical models have been proposed to solve the problem of which requests to accept or deny based on current capacity and forecasts of future demand. However, regardless of the mathematical model and assumptions used, revenue management software systems ultimately need an internal control logic to implement the accept/deny recommendations. To date, two control schemes have been developed to implement accept/deny decisions: nested capacity allocation and static-bid prices.

The oldest and most widespread approach to implementing accept/deny decisions is to use nested capacity allocations (also called "booking limits") on the various classes and rates for the capacity. This is the approach used in the early work of Littlewood (1972) on discount fare class allocation. It was popularized in the academic literature by Belobaba (1987, 1989). This is the approach used in many of the older commercial revenue management systems.

One example of a nested capacity allocation scheme is known as Single-resource Nested Allocations. This approach was originally developed to allocate capacity of a single resource, for example a single flight leg, to one of n possible demand classes (fare-classes in airline industry). The control logic works as follows:

Let c be the total capacity. Let the net revenues of the n demand types be denoted $f_i$ and assume without loss of generality that these demand classes are indexed so that $f_1 > f_2 > Y > f_n$. A so-called nested allocation logic specifies values (protection levels) $x_1, x_2, Y, x_n$ that satisfy $$0 \leq x_n \leq x_{n-1} \leq Y \leq x_n = c.$$

Let y denote the remaining capacity. The logic is to accept demand class i if and only if $$y > x_i, i=1, Y, n$$

That is, demand class i is accepted if the remaining capacity exceeds the protection level, $x_i$, for that class. An alternative and more popular method to implement this same logic is to define a set of booking limits, $b_i$, using $$b_i = cBx_i$$

Let r denote the number of reservations on hand (r=c−y). In this case, the logic is to accept a request from demand type i if and only if $$r < b_i$$

That is, accept demand class i if and only if the number of reservations on hand is less than the booking limit for demand class i. The maximum available capacity for any class i is usually refelTed to as the authorization level and is defined by $$a_i = \max\{b_i Br, 0\}$$

These are the control logic schemes described in Belobaba (1987, 1989) and Brumelle et al. (1990, 1993) and elsewhere. Belobaba (1987, 1988) describes some approximate methods for setting allocation parameters while Brumelle et al. (1990, 1993) describe exact algorithms for computing the parameters.

Whatever method is used to compute the parameter values, the nested allocation structure has some distinct advantages. Namely, it has the desirable feature that a small number of control parameters (n booking limits or protection levels) can be calculated once by an optimization module. Then, the accept/deny decisions dynamically adjust as available capacity changes. That is, as more capacity is sold, more demand classes are "closed out" as booking limits are reached. Alternatively, when customers cancel, more capacity becomes available and some demand classes may "open up" as the available capacity exceeds their booking limits. In this way, the nested allocation structure adjusts to the evolving capacity conditions.

While the nested allocation scheme works well for a single resource, extending it to allocate capacity for multiple resources (legs of a flight network for example) is somewhat problematic. For example, it is not clear how to rank demand class that use different resources, so the nested structure becomes difficult to apply. Also, if allocations are defined for all revenue values and every combination of resources, the number of allocation values required becomes too large for practical implementation in a reservation system.

To avoid this large number of allocation values, most approaches for extending nested allocation control logic to networks involve converting the multiple-resource allocation problem into a collection of single-resource problems and then applying the controls generated by this collection of single-resource allocation problems.

This is accomplished as follows: First, the revenue values for a multiple resource request are adjusted by quantities that reflect the displacement value of the other resources used by the request. These displacement-adjusted fare values are then used to compute nested allocations for each leg. Displacement adjusted values are often clustered into "virtual classes" first to reduce the number of classes involved. This process of creating virtual classes is called indexing by Smith et al. (1992). See Williamson (1992) and Vinod (1990) for further discussion of this approach, which also goes by the name of virtual nesting (Smith et al. 1992).

These displacement-adjusted values have some advantages: They require only a small number of control variables and the nested allocation structure maintains the favorable property of adjusting accept/deny decisions as available capacity changes. They also provide a maximum available capacity for each demand class through the authorization levels. However, the displacement adjustment process and clustering into virtual classes adds a significant amount of complexity to the control logic. This complexity has made their implementation prohibitive for most users of revenue management systems.

An alternative control logic for multiple-resource problems is to use what are called resource bidprices. This idea was first proposed by Simpson (1989) and was extensively investigated in the Ph.D. dissertation of Williamson (1992). See also Cuny (1992) and Phillips (1994). Let m denote the number of resources to allocate. In a bid price control scheme, values (bid prices) $v_i$, i=1, . . . ,m are set for each of the m resources. Suppose a request comes in to purchase a set of resources $\{i_1, \ldots, i_k\}$. Then a bid price control would accept the request of net revenue value if and only if $$f > v_{i_1} + Y + v_{i_k}$$

That is, a request is accepted if and only if the fare exceeds the sum of the bid prices of all the capacity units required to satisfy the demand. The interpretation of the values $v_i$ is that they represent the threshold value of resource capacity. Again, a variety of optimization methods and approximations have been proposed for determining the bid price parameter values. (See Simpson (1989) and Williamson (1992).)

The advantage of the bid price logic is that it requires very few parameters, one value for each resource, and does not require separate displacement adjustment and indexing steps. The main weakness is that the logic is not dynamic. Specifically, the accept/deny decisions do not change if remaining capacity fluctuates and/or the time remaining in the horizon changes. As a result, the bid price values $v_i$ must be updated very frequently (usually by re-forecasting and re-optimizing a mathematical model) to ensure that they track changes in the available capacity among all resources. Ideally, this updating of bid-prices has to be done after each booking or cancellations (or change in the remaining resource) which is prohibitive to do operationally. They also do not provide any indication of the maximum available capacity for a given demand class and cannot be used directly to compute authorization levels.

SUMMARY OF THE INVENTION

In view of the foregoing, a need exists for a revenue management scheme that is robust enough to accommodate allocation of multiple resources, each of which is dependent on multiple variables, yet which possesses simplicity and ease of implementation. The present invention satisfies this need through use of multidimensional lookup tables that are employed to manage revenue from each resource as a function of a plurality of variables (such as time and capacity, for example). The main benefit of the approach is to add a high degree of flexibility and dynamic adjustment ability to the control logic while keeping the number of controls used to within acceptable operational limits.

In this control logic, a multidimensional table (array) of threshold values is specified for each resource. Each dimension (axis) of the table corresponds to a variable that affects the threshold value of the resource. In an exemplary two-dimensional table for determining threshold values for travel reservations, one dimension of the table, t, is selected to index the number of remaining time periods and the other, x, is selected to index the remaining capacity for the desired reservation.

The lookup tables are employed in the method of the present invention in the following manner. First, a request for a resource, or a combination of resources, is received in a system computer either from another system or computer, or form an operator entering the request manually. The request not only identifies each of the resources, but also identifies a revenue value for the resources. For example, a multiple flight leg itinerary for an airline reservation represents a multiple resource allocation scenario, with each leg of the flight representing one of the resources, and the entered or calculated expected fare for the itinerary representing the revenue value.

Once the request has been entered, the computer accesses the lookup table for each resource identified in the request. The control logic for using the tables is that the threshold value used at any point in time for any given resource is obtained by looking in the appropriate place in the table. As the variables defining the dimensions (e.g., available capacity and the time remaining) of the table change, the threshold value in the table can adapt. After the threshold values for the present combination of variables are extracted from the tables, the net revenue of a request is compared to the sum of the threshold values of the resources required by the request. If the net revenue exceeds or equals the total of the threshold values, then it is accepted; if it does not, it is rejected. The ability of the threshold values for each resource to change as the variables (e.g., remaining capacity and remaining time) change, adds robustness and stability to the sale process—for instance, it offers protection that a sudden unexpected surge in demand at a low fare would not result in too much inventory being sold at a too low a rate (a problem with the static bid-price controls); at the same time, a persistent and inconsistent (with the forecasts) failure of demand to appear between re-forecasting re-optimizations would result in the current threshold value to automatically go down, a feature not present either in the allocation controls or static bid-price controls.

Thus, through this dynamic threshold value control logic, a considerable amount of dynamic adjustment capability can be achieved in a revenue or yield management system. At the same time, it preserves simplicity and speed, and requires only a modest number of control parameters, namely one table for each resource. Further, the present invention offers significant generalization in the degree of control, as well as superior robustness with respect to forecasting errors and operational factors compared to the current control logic used to control inventory in revenue management systems.

Another major advantage of the tables is that they can be used to quickly compute maximum allocations for each demand type. This is achieved by successively adding the threshold values and then decrementing each resource's capacity value until the sum of the threshold values exceeds the net revenue of the demand type. The amount by which the capacity was decremented gives the maximum capacity allocation for the demand type. This logic follows simply by considering how many requests of a given type would be accepted in sequence.

This decision logic requires only a simple table lookup (database query or memory access) operation, which is very fast. It is capable of mimicking the decisions of nested allocation and traditional bid price controls, but provides additional flexibility to allow the threshold values to adjust to capacity and time changes. It also allows for easy calculation of maximum available capacity for any given type of request. Moreover, since the lookup table logically separates the optimization modules and reservation-acceptance modules, it provides improved additional robustness in the operation of revenue management systems. Also, it simulates frequent re-optimizations and is highly resilient to forecasting errors and bias in the forecasts.

BRIEF DESCRIPTION OF THE DRAWINGS

The features and advantages of the present invention will become apparent form the following detailed description of a preferred embodiment thereof, taken in conjunction with the accompanying drawings, in which:

FIGS. 2A and 2B are example two dimensional threshold value tables that are employed to illustrate the functionality of the preferred embodiment;

DETAILED DESCRIPTION OF THE PREFERRED EMBODIMENT

Figure 1:
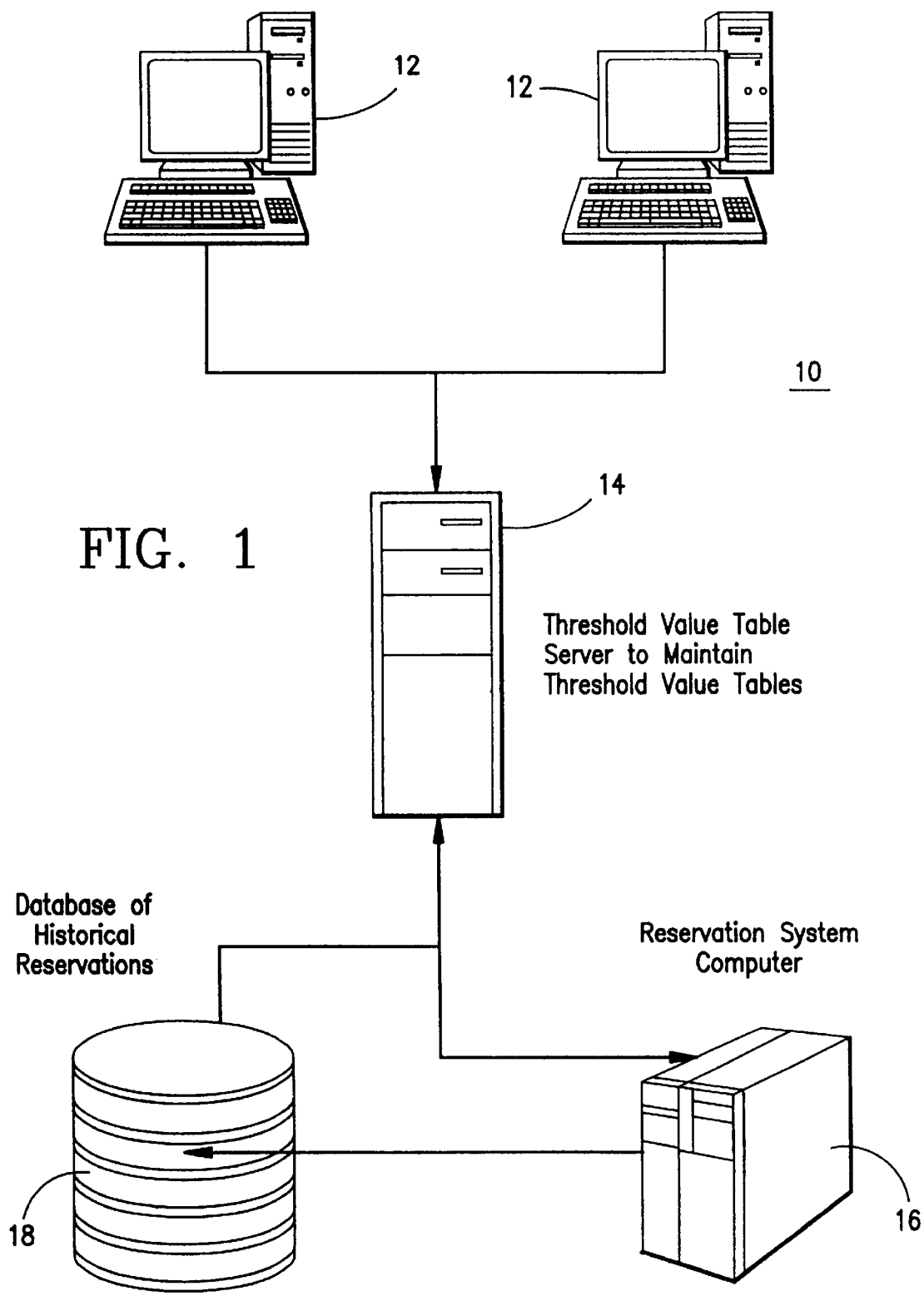
FIG. 1 is a schematic diagram of networked computer system that can be employed to implement the preferred embodiment of the present invention.

With reference first to FIG. 1, a revenue management system 10 is illustrated that is employed for implementing a first preferred embodiment of the present invention for managing reservations for a limited capacity resource, such as seats on an airline flight. The system 10 includes a plurality of networked computers 12, each of which communicates with a threshold value table server 14. In this embodiment of the invention, the threshold value table server 14 manages access to a plurality of lookup tables referred to as dynamic threshold value tables, each of which contains threshold values for a resource as a function of two or more variables. A reservation system computer 16 is interfaced to the threshold value table server 14 which handles reservation bookings requested through the computers 12, and manages the reservation yield. Finally, a database 18 is provided for maintaining historical records of all processed reservations.

In the operation of the system 10, a system operator enters a request for either a reservation or an authorization level for a particular itinerary into one of the computers 12. In response, the bid-plice table server 14 accesses all applicable threshold value tables for the itinerary, and supplies them to the reservation system computer 16 for processing. In the case of an itinerary consisting of multiple airline flight legs, a threshold value table will be provided for each flight leg. In this example, as will be discussed in greater detail below in conjunction with FIGS. 2A–2B, the reservation system computer 16 employs the threshold value tables to determine acceptable price values for each flight leg of the requested itinerary. The sum of these is compared to the net revenue expected from the use of the resources for the reservation system to determine whether the reservation will be accepted and/or how many reservations at the given revenue value will be accepted. The net revenue value is received by the system either by being entered by the system operator or another computer system. In addition, this value may be calculated by another system.

To better understand the threshold value tables and their use, reference is made to FIGS. 2A and 2B which illustrate two examples of such tables for two undefined resources, Resource 1 and Resource 2. Each of the tables comprises a two-dimensional table (array) of numerical values that is specified for each resource. One dimension or axis of the table, t, indexes the number of remaining time periods available for reserving the resource, and the other, x, indexes the remaining capacity for the resource. The shaded area in each of the tables represent regions where a revenue value of 80 and 25 for Resource 1 and Resource 2, respectively, will be accepted for the particular combination of t and x.

The threshold value used at any point in time for any given resource is obtained by looking in the appropriate place in the table. For example, consider Table 1 of FIG. 2A. If the remaining capacity for this resource is 3 units and the remaining time index is 7, then the table value is 69.61. Thus, the threshold value in effect under these conditions is 69.91. If the available capacity changes or the time remaining changes, the threshold value in the table can adapt. Continuing the example, if the remaining time index is 7 and 2 of the 3 units of capacity are sold, one unit of capacity remains. In this case, the value in Table 1 of FIG. 2A indicates that the threshold value has increased to 116.6.

As discussed above in conjunction with FIG. 1, the reservation system computer 16 compares the net revenue of a request to the sum of the threshold values of the resources required by the request. If the net revenue exceeds or equals the total of the threshold values, then it is accepted; if it does not, it is rejected. For example, suppose the time index remaining is 7, the Table 1 resource has 3 units of capacity remaining and the Table 2 resource has 4 units of capacity remaining. The acceptable threshold values for each resource are then 69.91 and 4.001, respectively. If a request is received that requires both resources with a net revenue of 70, the computer 16 compares it to the sum 69.91+4.001= 73.911. Since 70<73.991, the request is rejected.

The difference between this process and conventional bid price logic is that the threshold value for each resource changes as remaining capacity and remaining time change. For example, if there is a cancellation of a previously accepted request for the resource in Table 1 so that the remaining capacity increases to 4, the new sum becomes 34.71+4.001=38.781. In this case, a request with net revenue of 70 will be accepted. After accepting this request, however, the remaining capacity of resource 1 would be 3 again and the threshold value would rise to its previous value of 69.91. Therefore, another request of the same type would be rejected if it arrived next.

Figure 3:
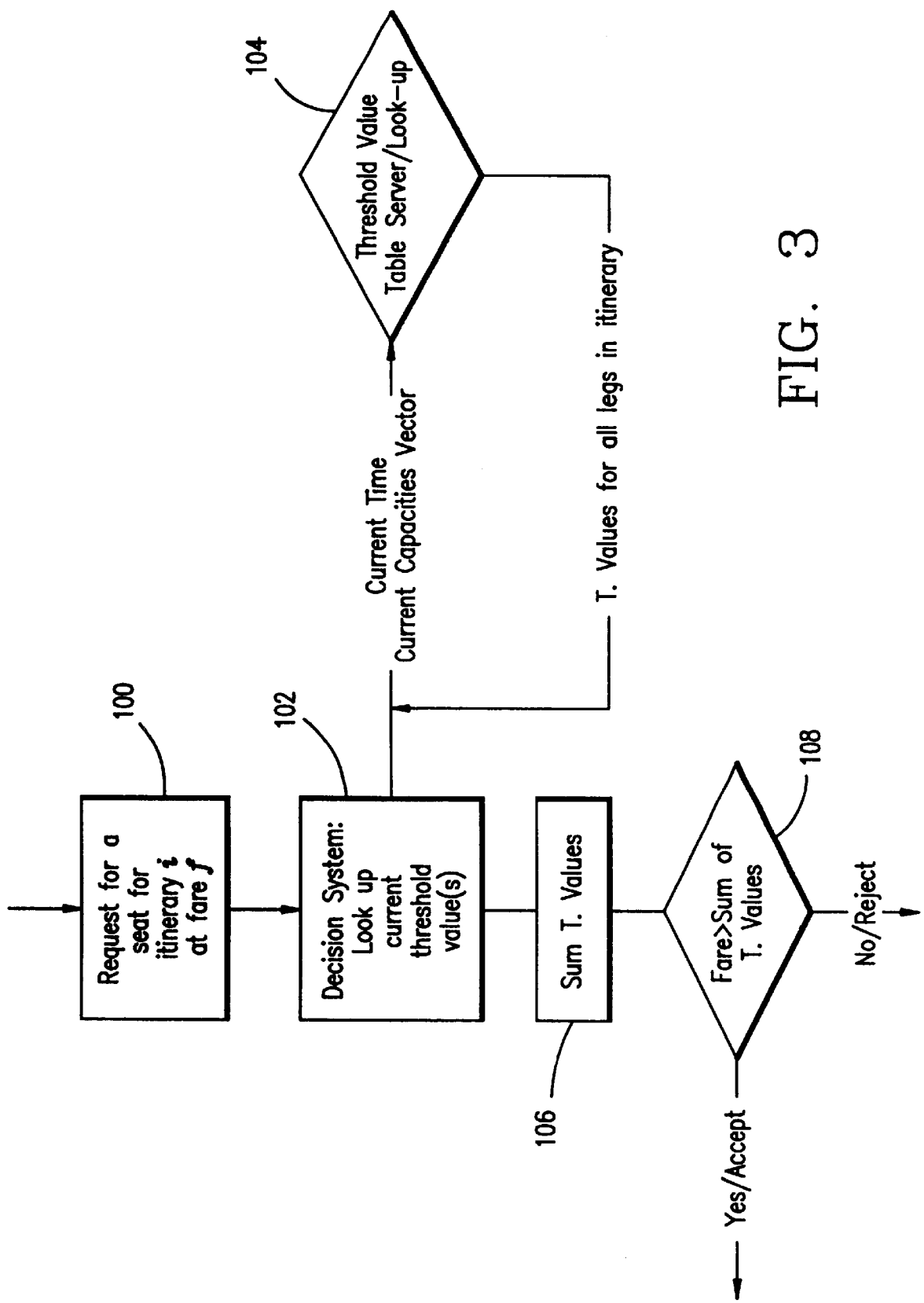
FIG. 3 is a flow chart illustrating the logic used in an exemplary application of the preferred embodiment for processing requests for seat reservations using the threshold value tables.

The logic of this decision rule is diagramed in the flow chart of FIG. 3 for the specific example where each resource is a seat on a flight leg of a requested itinerary i, and the threshold values in each lookup table represent minimum prices that will be accepted for the corresponding flight leg. First, at step 100, the seat reservation request is received from a system operator or another system, and identifies the itinerary i, as well as the fare f, which the passenger wishes to pay. Next, at step 102, the reservation system computer 16 performs a lookup operation for the current threshold value for each flight leg in the itinerary. This is accomplished by sending the current time and current capacity vector to the threshold value table server 14. In response, at step 104, the threshold value table server 14 accesses the threshold value table for each of the flight legs, and retrieves the price value for each leg corresponding to the time and capacity vector. The threshold values for all of the legs in the itinerary are then returned to the reservation system computer 16. Finally, at step 106, the reservation system computer sums all of the retrieved threshold values, and, at step 108, compares the sum to the requested fare f. If f is greater than or equal to the sum the reservation is accepted; otherwise, it is rejected. If the reservation is accepted, a record of the reservation is sent to the database 18 so that the current capacity will be properly adjusted for the next reservation request requiring any of the legs in the itinerary i.

Figure 4:
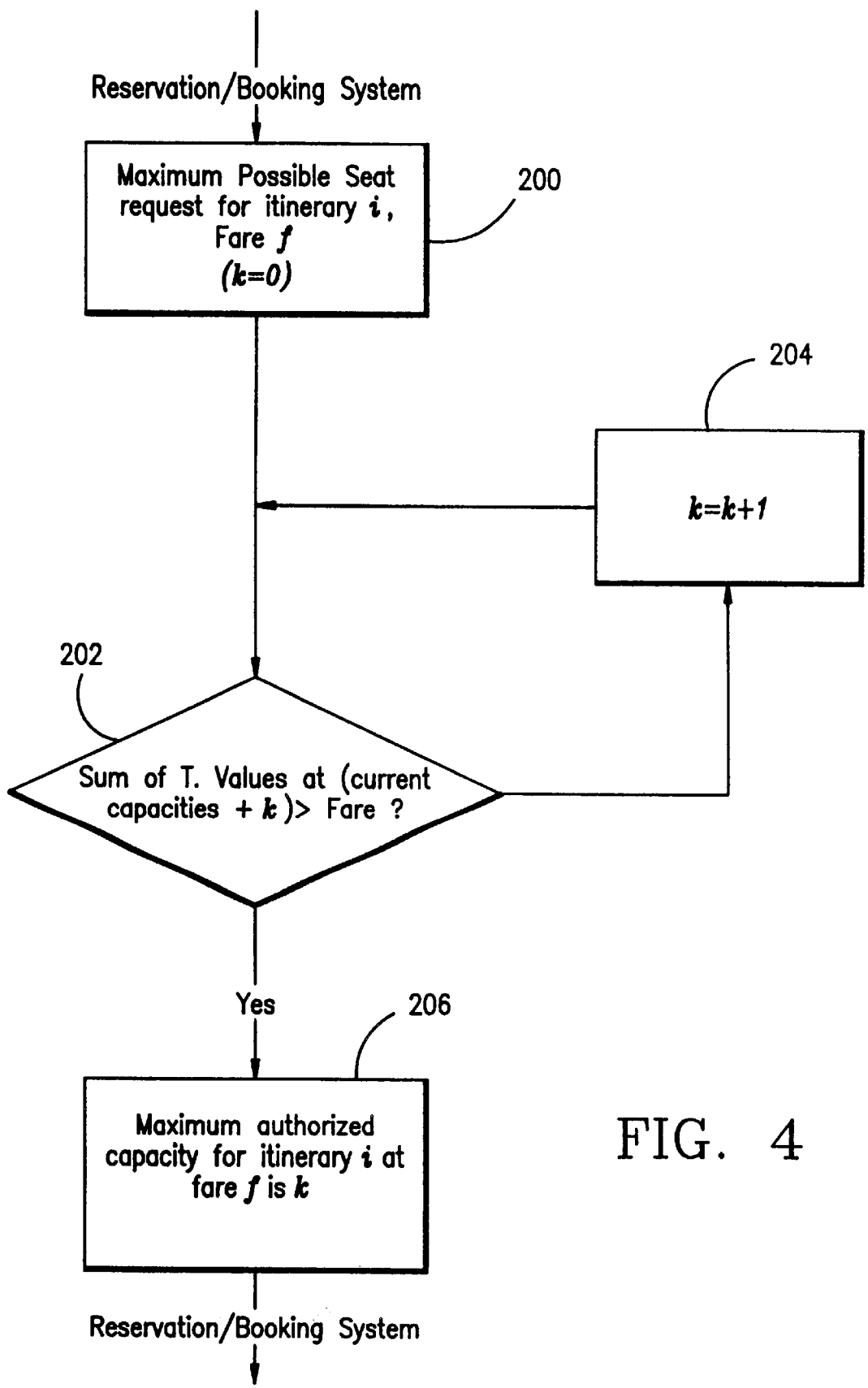
FIG. 4 is a flow chart illustrating the logic used in an exemplary application of the preferred embodiment for determining the maximum number of seats available at a predetermined fare using the threshold value tables.

A second major advantage of the dynamically adjustable threshold value tables is that they can be used to quickly compute maximum allocations for each demand type. This is achieved by successively adding the threshold values and then decrementing each resource's capacity value until the sum of the threshold values exceeds the net revenue of the demand type. The amount by which the capacity was decremented gives the maximum capacity allocation for the demand type. This logic follows simply by considering how many requests of a given type would be accepted in sequence. The logic is diagramed in the flow chart in FIG. 4, and an example of this authorization level calculation follows. First, at step 200, a system operator enters a request for the maximum possible seat reservations that will be accepted for an itinerary i at a fare per seat of no more than f. A count k is initialized to 0 to keep track of the total number of seats available atf Next, at f. step 202, the process of FIG. 3 is carried out to determine whether a first seat reservation will be accepted at fare for the current capacity and time vector. Assuming it will be accepted, k is incremented by 1 at step 204, and step 202 is repeated, but this time with the current used capacity incremented by 1, and the current available capacity decremented by 1. This process is repeated until the sum of the threshold values is greater than or equal to the fare for the (k+1)th request. When this occurs, the value k is determined at step 206 to be the number of reservations that will be accepted at the fare f for the itinerary i, and this value is returned to the reservation/booking system.

To illustrate this process more clearly, the tables in FIGS. 2A and 2B may be employed in the following example. Consider Tables 1 and 2 with 10 units of time remaining, with Resource 1 having 6 units of capacity remaining (threshold value of 19.95) and with Resource 2 having 4 units remaining (threshold value of 14.5). Suppose it is desired that an authorization level be computed for a demand class that has a net revenue of 160 and requires both Resources 1 and 2.

Comparing 160 to the current threshold values of 19.95+14.50=34.45, the first request of this type would be accepted. Proceeding, the capacity values of Resources 1 and 2 are decremented to 5 and 3, respectively, which yield threshold values of 44.03 and 38.66, respectively. The new sum of the prices is 44.03+38.66=82.69. Since this sum is still less than 160, a second request of this type would be accepted. Continuing in this manner, it is determined that up to 3 units of the 160 demand type can be accepted without the threshold value total exceeding 160. However, the fourth request of this type would push the total threshold value fiom the tables up to 207.03, so that this request would be rejected. Thus, the maximum capacity that would be sold B the authorization level B is 3 units. In this way, an authorization level can be quickly computed for any demand type with any associated net revenue and requiring any arbitrary set of resources.

Although the foregoing examples illustrate the process of the present invention, it will of course be understood that the invention is not limited to any particular application. On the contrary, the threshold value tables can be used for managing any type of resource reservation application where the threshold value of one or more resources varies as a function of two or more variables. For example, although the invention is particularly useful for managing transportation and accommodation related sales or reservations (e.g., airline, train, bus and hotel reservations, etc.), the invention may also be employed for managing cargo inventory. In this application, three-dimensional threshold value lookup tables are preferably employed, with one dimension for each of the following three variables that have an influence on current acceptable threshold values: time, weight and volume. Further, although the invention is particularly suited for determining acceptable monetary values for travel reservations, the lookup tables can be used for determining any type of acceptable threshold value that fluctuates as a function of two or more variables.

Other applications of the present invention include allocation of advertising time slots and allocation of tickets to facilities (sports, theaters, cinema, amusement parks, resorts). In the case of advertising time slots, the dimensions for the lookup table will be remaining available time-slots, and the time of broadcast for the media industry (television, radio, print media, Internet advertising, etc.). In the case of tickets to facilities, the dimensions for the lookup table will be time remaining until the scheduled event, and number of available seats remaining in each class.

In conclusion, the present invention, through use of the dynamically adjustable threshold value tables, provides a vastly improved and robust revenue or yield management system and method that can easily accommodate changes in resource threshold values in response to many variables, without requiring complex computer software. Although the present invention has been disclosed in terms of a preferred embodiment and variations thereon, it will be understood that numerous additional variations and modifications could be made thereto without departing from the scope of the invention as set forth in the following claims.

What is claimed is:

1. A computer implemented method for managing allocation of a resource to be utilized for an event at a scheduled future time, said method comprising the steps of:
   a) receiving a request for at least a first resource to be utilized during said event in a revenue management system computer;
   b) accessing a multidimensional lookup table with said computer, said table including 1) an axis for each dimension defining a corresponding one of a plurality of variables that affects an acceptable threshold value for said resource, said variables at least including an available capacity for said resource and a plurality of future time-points between the current time and said scheduled future time and 2) a plurality of threshold value entries for said resource, one for each of a plurality of combinations of values for said variables;

c) determining a present value for each of said variables, including a time of the request for said resource;

d) retrieving a threshold value entry from said lookup table corresponding to a combination of said variables corresponding to the present value for each of said variables, including the time of the request for the resource;

e) comparing the selected threshold value entry to an expected net revenue value for said resource; and f) if the expected net revenue value is greater than or equal to the selected threshold value entry, generating an indication that the request for the resource will be accepted.

2. The method of claim 1, wherein said step of receiving a request further comprises receiving a request for a plurality of resources; said step of accessing further comprises accessing a plurality of said lookup tables, one for each of said resources; said step of comparing further comprises comparing a sum of the threshold value entries for each of said resources to a combined net revenue value for the plurality of the resources; and, said step of generating further comprises generating an indication that the request for the resources will be accepted if the net revenue value is greater than or equal to the sum of the selected threshold value entries.

3. The method of claim 2, wherein the step of generating an indication that the request for the resources will be accepted if the revenue value is greater than or equal to the sum of the selected threshold value entries further comprises the steps of:

1) if the revenue value is greater than or equal to the sum of the selected threshold value entries, then:
   i) determining that a request for said resources will be accepted at the revenue value for the current combination of values for said variables by incrementing a count for said number of acceptable requests by one unit;
   ii) adjusting the current values of said variables as necessary to accommodate the reduction of available capacity of each of said resources by one unit; and
   iii) returning to step c) for the adjusted current values of said variables to determine whether another request for said resources will be accepted at the revenue value;

2) if the revenue value is less than the sum of the threshold value entries in said lookup tables corresponding to the current combination of values for said variables, then outputting the value of said count as the total number of requests that will be presently accepted for said resources at said revenue value.

4. The method of claim 1, wherein the step of generating an indication that the request for the resource will be accepted if the revenue value is greater than or equal to the selected threshold value ently further comprises the steps of:

1) if the revenue value is greater than or equal to the selected threshold value entry, then:
   i) determining that a request for said resource will be accepted at the revenue value for the current combination of values for said variables by incrementing a count for said number of acceptable requests by one unit;
   ii) adjusting the current values of said variables as necessary to accommodate the reduction of available capacity of said resource by one unit; and
   iii) returning to step c) for the adjusted current values of said variables to determine whether another request for said resource will be accepted at the revenue value;

2) if the revenue value is less than the threshold value ently in said lookup table corresponding to the current combination of values for said variables, then outputting the value of said count as the total number of requests that will be presently accepted for said resource at said revenue value.

5. The method of claim 1, wherein said event comprises a trip to a selected destination, and said resource comprises seats on means of transportation for said trip, and said variables comprise remaining available seat capacity and remaining time until said trip is scheduled to commence.

6. The method of claim 1, wherein said event comprises a trip to a selected destination, and said resource comprises cargo space on a means of transportation for said trip, and said variables comprise remaining available cargo weight, remaining available cargo volume and time remaining until said trip is scheduled to commence.

7. The method of claim 2, wherein said event comprises a trip to a selected destination, and each of said resources comprises seats on a means of transportation for one of a plurality of legs of said trip, and said variables comprise remaining available seating capacity and remaining time until said trip is scheduled to commence.

8. The method of claim 2, wherein said event comprises a trip to a selected destination, and each of said resources comprises cargo space on a means of transportation for one of a plurality of legs of said trip, and said variables comprise remaining available cargo weight, remaining available cargo volume and time remaining until said trip is scheduled to commence.

9. The method of claim 1, wherein said resource comprises advertising time slots and said variables comprise remaining available time-slots and the time remaining until said advertising is scheduled to be broadcast.

10. The method of claim 2, wherein said resources complise advertising time slots for one of a plurality of days and said variables comprise remaining available time-slots and the time remaining until said advertising is scheduled to be broadcast.

11. The method of claim 1, wherein said resource comprises tickets to facilities for said event, and said variables comprise time remaining until the scheduled event, and the number of seats remaining in each of one or more classes for the event.

12. The method of claim 2, wherein said resources comprise tickets to facilities for a plurality of seats for a plurality of scheduled events, and said variables comprise time remaining until the scheduled events, and the number of seats remaining in each of one or more classes for the events.

13. The method of claim 1, wherein said threshold values in said lookup table represent the minimum price that will be accepted for said resource, said price varying as a function of said plurality of variables defining said dimensions of said lookup table.

14. The method of claim 2, wherein said threshold values in said lookup tables represent the minimum prices that will be accepted for each of said resources, said prices varying as a function of said plurality of variables defining said dimensions of said lookup tables.

15. A system for managing allocation of a resource to be utilized for an event at a scheduled future time comprising;

a) a computer for processing requests for allocation of at least a first resource to be utilized during a period of booking for said event;

b) at least a first multidimensional lookup table interfaced to said computer, said table including 1) an axis for each dimension defining a corresponding one of a plurality of variables that affects an acceptable threshold value for said resource, said variables at least including a currently available capacity for said resource and a length of time remaining until said event is scheduled to occur; and 2) a plurality of threshold value entries for said resource, one for each of a plurality of combinations of values for said variables; and c) means in said computer for:
1) receiving a request for said resource;
2) accessing said lookup table to retrieve a current acceptable threshold value for said resource based on a current combination of values for said variables;
3) comparing the retrieved threshold value fiom said lookup table to a net revenue value for said request; and
4) generating an indication that the request will be accepted if the net revenue value for the resource is greater than or equal to the threshold value in the lookup table, and that the request will be rejected otherwise.

16. The system of claim 15, wherein said computer processes requests for allocation of a plurality of resources, and said system further comprises a plurality of said lookup tables interfaced to said computer, each said table assigned to a corresponding one of said resources and including 1) an axis for each dimension defining a corresponding one of a plurality of variables that affects an acceptable threshold value for said resource, said variables at least including an available capacity for said resource and a length of time remaining until said event is scheduled to occur; and 2) a plurality of threshold value entries for said resource, one for each of a plurality of combinations of values for said variables; and said means in said computer for receiving, accessing, comparing and generating further comprises means for:

1) receiving a request for said resources;
2) accessing said lookup tables to retrieve current acceptable threshold values for each of said resources based on current combinations of values for said variables;
3) comparing a sum of the retrieved threshold values from said lookup tables to a net revenue value for said request; and
4) generating an indication that the request will be accepted if the net revenue value for the resource is greater than or equal to the sum of the threshold values in the lookup tables, and that the request will be rejected otherwise.

17. The system of claim 16, wherein said means in said computer for receiving, accessing, comparing and generating further comprises means for determining a total number of requests for said resources that will be accepted at said net revenue value.

18. The system of claim 15, wherein said means in said computer for receiving, accessing, comparing and generating further comprises means for determining a total number of requests for said resource that will be accepted at said net revenue value.

19. The system of claim 15, wherein the threshold values in said lookup table represent minimum acceptable prices for said resource as a function of said variables, and said variables are selected fiom the group comprising remaining capacity available, remaining time until said event is scheduled to occur, remaining volume available and remaining weight available for said resource.

20. The system of claim 16, wherein the threshold values in said lookup tables represent minimum acceptable prices for said resources as a function of said variables, and said variables are selected from the group comprising remaining capacity available, remaining time until said event is scheduled to occur, remaining volume available and remaining weight available for said resources.

* * * * *